United States Patent
Lavi et al.

(10) Patent No.: US 9,497,729 B2
(45) Date of Patent: Nov. 15, 2016

(54) INTEGRATING IN-VEHICLE ACCESS-POINT WITH CELLULAR OFFLOADING SYSTEM

(71) Applicant: GM Global Technology Operations LLC, Detroit, MI (US)

(72) Inventors: Nadav Lavi, Ramat-Hasharon (IL); Kobi Jacob Scheim, Pardess Hanna (IL); Moshe Laifenfeld, Haifa (IL)

(73) Assignee: GM Global Technology Operations LLC, Detroit, MI (US)

(*) Notice: Subject to any disclaimer, the term of this patent is extended or adjusted under 35 U.S.C. 154(b) by 99 days.

(21) Appl. No.: 13/833,749

(22) Filed: Mar. 15, 2013

(65) Prior Publication Data

US 2014/0274048 A1  Sep. 18, 2014

(51) Int. Cl.
*H04W 88/08* (2009.01)
*H04W 64/00* (2009.01)
*H04W 48/04* (2009.01)

(52) U.S. Cl.
CPC ........... *H04W 64/006* (2013.01); *H04W 48/04* (2013.01)

(58) Field of Classification Search
CPC . H04W 48/04; H04W 64/006; H04W 84/05; H04W 88/00; H04W 88/08
USPC ....... 455/410, 411, 569.1, 575.9, 95, 96, 99, 455/152.1, 238.1, 345; 340/426.16, 426.23
See application file for complete search history.

(56) References Cited

U.S. PATENT DOCUMENTS

| | | | |
|---|---|---|---|
| 2007/0156881 A1* | 7/2007 | Nou | 709/223 |
| 2008/0045168 A1* | 2/2008 | Ebner et al. | 455/152.1 |
| 2010/0185472 A1* | 7/2010 | Goodermuth | G06Q 10/063 705/7.11 |
| 2012/0046019 A1* | 2/2012 | Rodkey, Jr. | H04M 1/72577 455/418 |
| 2012/0046046 A1* | 2/2012 | Momiyama et al. | 455/456.1 |
| 2012/0238252 A1* | 9/2012 | Levitan et al. | 455/414.1 |
| 2014/0004886 A1* | 1/2014 | Gillett | H04W 4/027 455/456.6 |

* cited by examiner

*Primary Examiner* — Thai Vu
(74) *Attorney, Agent, or Firm* — Quinn Law Group, PLLC (57) ABSTRACT

A method and system for selectively providing cellular offload services to mobile user data devices via vehicle-based access points. Subscribers and affiliates of vehicle-related online services register their user data devices for authorized connections. Vehicle metrics are used to determine the state of a vehicle (being driven or parked), and the metrics of the user device can be compared with the vehicle metrics to determine if the user device is inside the vehicle. Limiting access to authorized user devices reduces load on the vehicular access points and allows preventing the vehicular access points from being erroneously included on access point maps and thereby infecting the maps.

5 Claims, 5 Drawing Sheets

INTEGRATING IN-VEHICLE ACCESS-POINT WITH CELLULAR OFFLOADING SYSTEM

BACKGROUND

Cellular telephony networks have been adapted to carry Internet data traffic, but the ongoing rapid increase in data demand by the growing population of smartphones and similar mobile devices has placed heavy burdens on the ability of cellular networks to handle the data traffic. In response to this challenge, cellular operators have implemented technologies for off-loading data traffic from cellular networks onto other networks. Solutions include private offloading systems set up by cellular operators, public non-cellular wireless Internet connections by arrangement with various commercial entities, open networks established by municipalities and public areas such as shopping malls, and similar setups to accommodate mobile users.

An important and developing area for offloading cellular data traffic now centers on the vehicle market. Currently, a vehicle may be equipped with on-board integrated cellular connectivity, non-cellular wireless Internet connectivity, GPS, and infotainment capabilities. From a data perspective such a vehicle is considered as a "vehicle telematics entity" or a "connected vehicle". A vehicle so-equipped may now be able to provide additional access points to mobile device users for cellular offloading.

It is important to note that cellular offloading does not necessarily require elimination of data transport over cellular networks. A vehicular access point may often rely on a cellular network to provide backhaul services. Even then, however, the vehicular access point can frequently reduce the net data load on the cellular network. The vehicle is capable of establishing a much higher-quality data connection with the cellular network than a mobile user device, on account of having a better antenna, a more powerful cellular transmitter, and more available power than a mobile user device. Thus, the vehicle can consolidate a number of data users into a single high-quality data connection in place of many data connections of ordinary or marginal quality, thereby reducing consumption of resources and minimizing overhead and transmission data losses associated with the many data connections. Therefore, the term "cellular offloading" herein denotes any redistribution of data traffic that results in an overall decrease in the data load on a cellular network. Thus, by transferring a number of users to non-cellular connections, a vehicular access point can perform cellular offloading, even when using the cellular network for backhaul of the consolidated data traffic.

There are two user regimes for which a connected vehicle may provide an access point:

Internal users: An access point for users riding within the moving vehicle (driver and/or passengers).

External users: A public access point for users, such as pedestrians, outside the vehicle when it is stationary.

Unfortunately, there are currently no available methods or systems to enable a connected vehicle to reliably and safely provide an access point for either internal users or external users. Current restrictions are as follows:

Current methods and systems to automatically locate and connect to cellular offload access points for user mobile devices typically rely on access point maps, which are collected and disseminated for use with automated systems and software applications ("apps") that manage offload connections for the mobile user devices. As noted elsewhere herein, although such access point maps are typically updated on an on-going basis, they cannot be updated fast enough or reliably enough to track access points associated with vehicles. An access point of a connected vehicle lacks a persistent location and therefore should never be added to an access point map, because doing so will infect the access-point map with false location data. Currently, therefore, a user device connecting to a vehicular access point of a vehicle poses a risk that the device may automatically update a remote server with information about the access point, thereby causing the access point database to become infected.

In addition, for internal users, user mobile devices are typically provided, via download, with policies that govern the establishing of non-cellular wireless Internet connections. Such policies may cause a user device in a connected vehicle to automatically seek a connection to an access point outside the vehicle, rather than to the vehicular access point provided by the connected vehicle.

There is also a problem that a user device located outside of a connected vehicle may attempt to connect to the vehicular access point. In addition to the risk of access point map infection, this is liable to burden the vehicular access point with additional load without providing reliable service to the connecting user device.

Furthermore, a vehicular access point may be exposed to unauthorized connections.

Vehicular access points can provide valuable wireless coverage for offloading user mobile devices from cellular networks onto non-cellular networks, and it would therefore be highly desirable to have a method by which user devices can automatically be made aware of vehicular access points and be automatically connected thereto, without the risks of unauthorized connections and infecting access point databases, and, in the case of user devices inside a connected vehicle, without being automatically connected to outside access points instead. These goals are met by embodiments of the present invention.

SUMMARY

Embodiments of the present invention provide controlled connection to vehicular access points in a manner that avoids the risks of unauthorized connections and infecting access point databases, and, for user devices inside a connected vehicle, without being automatically connected to outside access points instead of the proper vehicular access point.

According to various embodiments of the invention, a database is compiled of subscribers to an on-line vehicle-related service providing benefits including, but not limited to: navigational guidance; vehicle assistance; travel infotainment; and road condition notifications and advisories. A typical subscriber, for example, might be the owner or lessor of a connected vehicle. According to a related embodiment, as part of a subscription package, a subscriber might be able to add members or his or her family, friends, and business associates to the subscription, who would then be listed as being entitled to receive service as affiliates. Subscribers and affiliates would register their user mobile data devices with the service, which would qualify their mobile devices to connect to vehicular access points which are similarly registered with the service.

According to certain embodiments of the invention, registered mobile devices of subscribers and affiliates are coordinated with registered vehicular access points to establish authorized connections automatically to attain the goals described above. Various embodiments of the present invention provide the required coordination between mobile devices and vehicular access points by correlating aspects of current vehicle states with relevant aspects of the mobile devices.

Therefore, according to an embodiment of the present invention, there is provided a method for managing a connection between a vehicular access point located on a vehicle and a mobile user data device, the method including: (a) receiving, by the vehicular access point, a request from the mobile user data device to establish a connection with the mobile user data device; (b) identifying, by processing device, the mobile user data device; (c) determining, by the processing device, whether the mobile user data device is registered in a predetermined subscriber database; (d) if the mobile user data device is registered in the subscriber database, then allowing the mobile user data device to establish the connection; (e) if the mobile user data device is not registered in the subscriber database, then obtaining vehicle metrics of the vehicle; (f) responsively to obtaining the vehicle metrics of the vehicle, determining whether the vehicle is being driven or is parked; (g) if the vehicle is parked, then denying the connection request; (h) if the vehicle is being driven, then obtaining metrics of the vehicle; (i) determining whether the mobile user data device is moving with the vehicle; (j) if the mobile user data device is moving with the vehicle, then allowing the mobile user data device to establish the connection; and (k) if the mobile user data device is not moving with the vehicle, then denying the connection request.

In addition, according to another embodiment of the present invention there is provided a system for managing a connection between a vehicular access point located on a vehicle and a mobile user data device making a request for a connection thereto, the system including at least one server connected to the Internet, wherein the at least one server has access to a subscriber database and a vehicular access point database, and wherein the at least one server is operative to: (a) identify the mobile user data device; (b) responsively to identifying the mobile user data device, determine whether the mobile user data device is registered in the subscriber database; (c) obtain vehicle metrics from the vehicle; (d) responsively to obtaining metrics from the vehicle, determine whether the vehicle is being driven or is parked; (e) obtain metrics from the mobile user data device; (f) responsively to obtaining metrics from the mobile user data device, (g) compare metrics from the mobile user data device with the vehicle metrics to determine if the mobile user data device is moving with the vehicle; (h) if the mobile user data device is registered in the subscriber database or if the mobile user data device is moving with the vehicle, then authorize the vehicular access point to establish a connection with the vehicular access point; and (i) otherwise deny the request for a connection.

DEFINITIONS

The terms "mobile data device", "mobile user data device", and "mobile device" herein denote a device capable of maintaining a wireless data connection to the Internet, including, but not limited to: smartphones; and portable computers, such as notebook (or "laptop") computers and tablet computers.

The terms "non-cellular wireless Internet connection" and "non-cellular wireless Internet connectivity" herein denote a wireless connection between a mobile data device and a data network which provides Internet access but is not a cellular telephony network. Hence, the terms "data offloading" and "offloading" herein relate to transferring a data connection from a cellular telephony network to a non-cellular wireless Internet connection, as herein defined. The term "offloaded data" herein denotes user data transferred to a non-cellular wireless Internet connection. Data networks providing Internet access for a non-cellular wireless Internet connection include, but are not limited to: Local Area Networks (LANs); Metropolitan Area Networks (MANs); and networks complying with subsections of the IEEE 802 family Devices providing non-cellular wireless Internet connections to such data networks include, but are not limited to: Wi-Fi devices; and WiMAX devices. In the present disclosure, Wi-Fi devices are used as examples for purposes of illustration, it being understood that such examples and embodiments of the invention corresponding thereto are non-limiting. In addition, certain technologies (a non-limiting example of which is WiMAX) can function in both cellular and non-cellular networks. In the case of such technologies, it is understood that the designation "non-cellular" indicates that the applicable networks in which such technologies function are restricted to non-cellular networks.

The term "access point" herein denotes a device providing a non-cellular wireless Internet connection. The term "hotspot" herein denotes an access point for a non-cellular wireless Internet connection as well as the physical area in the immediate vicinity of the access point, within the usable wireless range of the access point.

The term "vehicular access point" herein denotes an access point located on or in a vehicle.

The term "access point map" herein denotes a prior-art database of access points according to their geographical locations, typically presented to users visually in the form of a geographical map via the Internet, and available to automated systems for automatically connecting mobile user devices to access points in the database. Access point maps are typically compiled via crowdsourcing methods, by which mobile user devices automatically report to a designated server the access point connections they encounter as the users move from one location to another. This reporting is typically done transparently in the background, usually with no direct involvement or awareness of the users. Along with the geographical coordinate locations and public names (SSID) of the access points, various features of the access points (e.g., security, signal quality, etc.) are also automatically reported for inclusion in the access point map (database). It is important to note that the crowdsourcing compilation depends on an unpredictable interaction between the reporting entities (the mobile user devices) and the reported entities (the access points), and is therefore inherently a stochastic process rather than a deterministic one. Consequently, the data of access point maps is not up-to-the-minute. The vast majority of access points are in fixed geographical locations, so latencies in the access point maps do not cause serious problems. Vehicular access points, however, move on a time scale which is small compared to the average access point map latency, which is why including vehicular access points on an access point map will infect the map.

The term "vehicular access point database" herein denotes a database of vehicular access points compiled by direct real-time interaction between a compiling server and the vehicular access points themselves. In contrast to the crowdsourcing compilations of access point maps (see above), the reporting of vehicular access point locations is fully deterministic and can be scheduled for updating on a rapid basis.

Consequently, a vehicular access point database can be maintained to have up-to-the-minute information at all times.

BRIEF DESCRIPTION OF THE DRAWINGS

The subject matter disclosed may best be understood by reference to the following detailed description when read with the accompanying drawings in which.

For simplicity and clarity of illustration, elements shown in the figures are not necessarily drawn to scale, and the dimensions of some elements may be exaggerated relative to other elements. In addition, reference numerals may be repeated among the figures to indicate corresponding or analogous elements.

DETAILED DESCRIPTION

Figure 1:
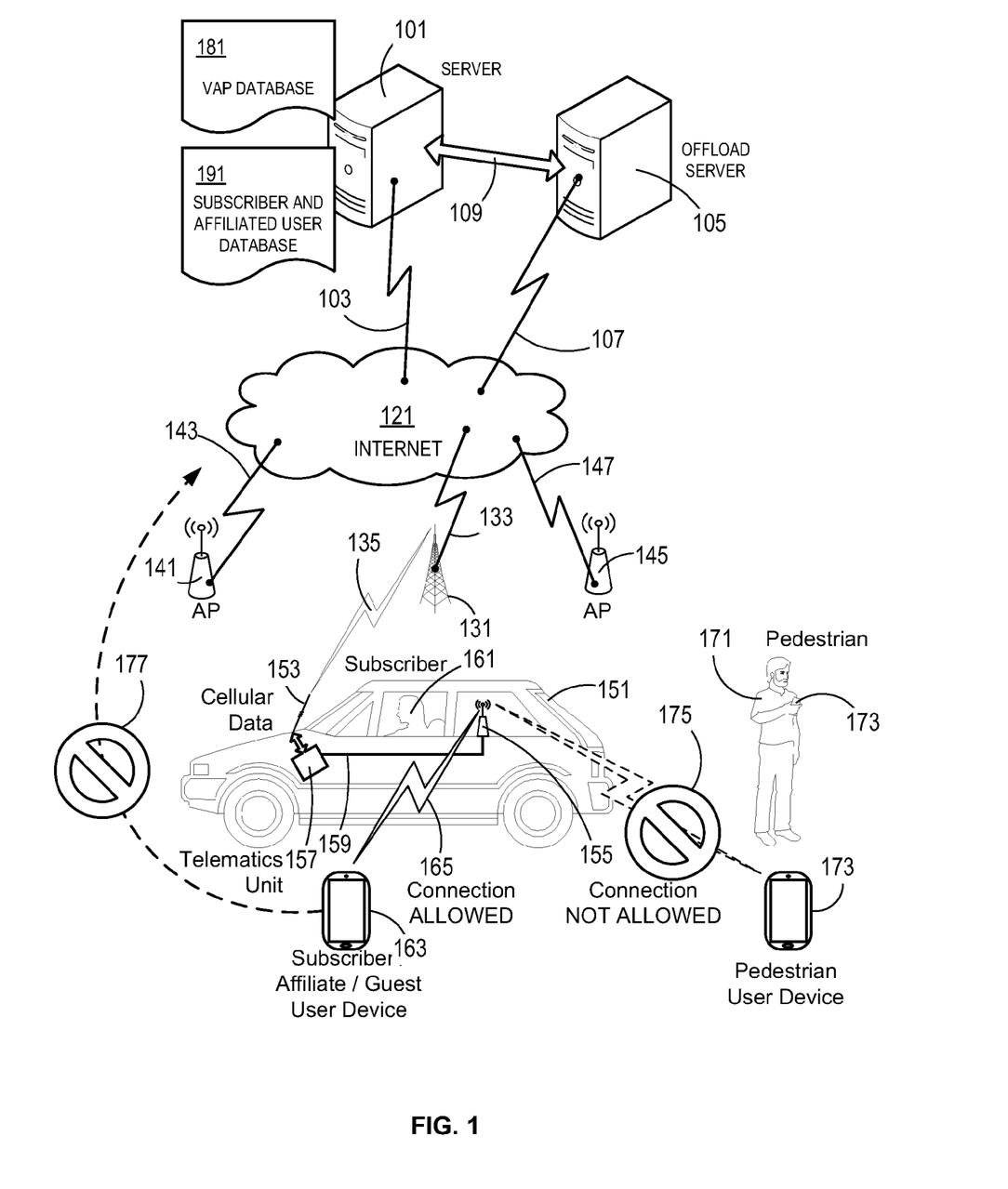
FIG. 1 conceptually illustrates a system configuration relating to a moving vehicle according to an embodiment of the present invention.

FIG. 1 conceptually illustrates a system configuration relating to a moving vehicle according to an embodiment of the present invention. A server 101 of an on-line vehicle-related service is connected via a link 103 to Internet 121. Server 101 maintains a database 181 of registered vehicular access points, correlated with their respective vehicles and other relevant data. Server 101 also maintains a database 191 of subscribers and affiliates, correlated with their respective user devices and other relevant data. In a related embodiment, other relevant data about a subscriber includes, but is not limited to: the vehicle(s) associated with the subscriber; the affiliate(s) associated with the subscriber; the subscriber's principal geographical region(s); and the subscriber's principal data interest(s). According to certain embodiments, correlating subscribers and affiliates with vehicles enables the use of vehicle metrics to facilitate and manage connections between user devices and vehicular access points. In an embodiment of the present invention, server 101 is a subscription server for a subscriber database.

An offload server 105 is connected via a link 107 to Internet 121, and has a virtual connection 109 with server 101. According to an embodiment of the invention, server 101 does not communicate with user devices in setting up connections with vehicular access points, but only provides offload server 105 with relevant data via virtual connection 109 for making connection management decisions.

A connected vehicle 151 is being driven, and has a telematics unit 157 with an antenna 153 for making data connections. Telematics unit 157 with antenna 153 is shown with a connection 135 to a cellular base station 131, which has a link 133 to Internet 121. By means of this arrangement, telematics unit 157 of vehicle 151 can communicate data with offload server 105. Access points 141 and 145 linked to Internet 121 by links 143 and 147, respectively, can provide non-cellular wireless Internet connections to telematics unit 157 if vehicle 151 is within range. A Wi-Fi vehicular access point 155 is connected to telematics unit 157 via a cable 159 and establishes a connection 165 to a user device 163 belonging to a subscriber 161 within vehicle 151. According to another related embodiment of the present invention, mobile device 163 is prevented from updating a remote server with data on vehicular access point 155; this preventing is symbolically represented by a block 177, and precludes infecting access point maps and databases with listings of vehicular access point 155.

According to another embodiment of the present invention, a mobile user device 173 outside vehicle 151 (such as a mobile user device of a pedestrian 171 or other user outside vehicle 151) which attempts to establish a connection with vehicular access point 155 is prevented by the system from doing so; this preventing is symbolically represented by a block 175, and precludes an unauthorized user and/or a user outside the vehicle from connecting to vehicular access point 155. As disclosed elsewhere herein, a system according to certain embodiments of the present invention utilizes vehicle metrics of vehicle 151 to recognize that device 173 is external to vehicle 151. In a related embodiment, for example, a query of user device metrics of user device 163 is made to determine if user device 163 is moving at the same speed and in the same direction as driven vehicle 151; user device 163 is deemed to be within vehicle 151 if and only if the velocities of user device 163 and vehicle 151 are substantially identical.

It is noted that for user device 163 to have a data connection to Internet 121, a suitable backhaul is necessary to complete the circuit. Such a backhaul can be provided by non-cellular wireless Internet connections via access points 141 or 145, and if these are not available, by cellular connection 135. Embodiments of the present invention as disclosed herein do not provide a backhaul, but rely on the existence of a suitable backhaul provided by other means, examples of which include both cellular and non-cellular connections.

In some embodiments of the invention corresponding to the configuration of FIG. 1, telematics unit 157, or a processor thereof, performs at least some of the control functions described above. In other embodiments, offload server 105 performs at least some of the control functions.

Figure 2:
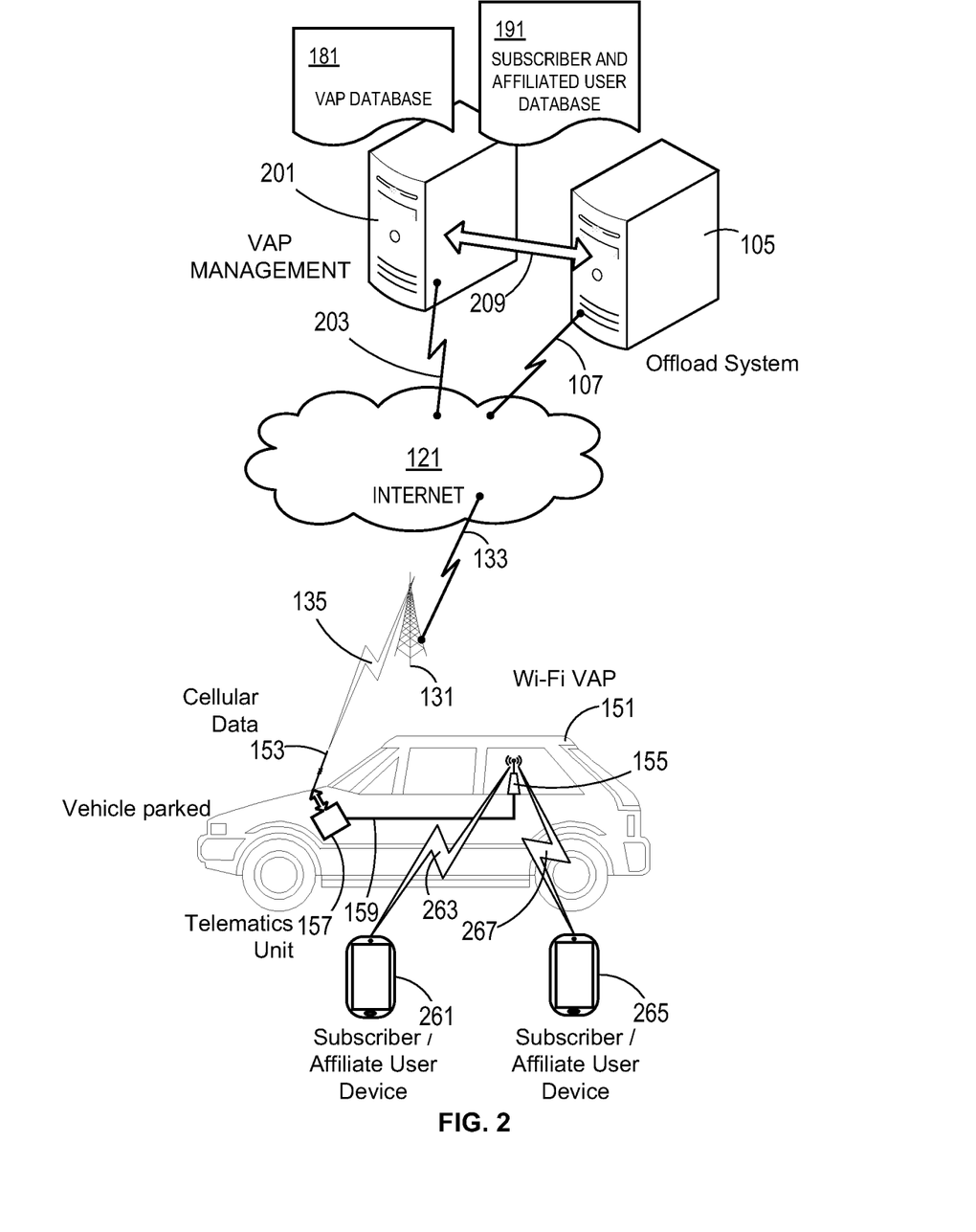
FIG. 2 conceptually illustrates a system configuration relating to a parked vehicle according to another embodiment of the present invention.

FIG. 2 conceptually illustrates a system configuration relating to parked vehicle 151 according to another embodiment of the present invention, in which vehicle metrics of vehicle 151 are analyzed to determine if vehicle 151 is parked. In one related embodiment, vehicle 151 is deemed to be parked when the engine is not running. In another related embodiment, vehicle 151 is deemed to be parked when the driver's seat is unoccupied. In still other related embodiments, combinations of such metrics of vehicle 151 (e.g.: doors are locked; parking brake set and transmission is in park setting; vehicle is unoccupied, etc.) are used to determine if vehicle 151 is parked.

According to various embodiments, vehicular access point 155 of parked vehicle 151 can serve as a public access point for a user device 261 provided that user device 261 is registered to a subscriber or affiliate as provided in database 191. This is also the case for additional user devices simultaneously, such as a user device 263, A vehicular access point management server 201 is connected to Internet 121 via a link 203, and has access to vehicular access point database 181 and subscriber/affiliate database 191 (also referred to herein simply as a "subscriber database"). In a related embodiment, vehicular access point management server 201 is a subscription server for a subscriber database. A virtual connection 209 between server 201 and offload server 105 enables proper functioning of offload of user devices 261 and 265.

By requiring a user device (such as user device 261) to be registered in database 191, these embodiments of the invention assure that user device 261 is authorized to connect to vehicular access point 155, and that vehicular access point 155 is not added to an access point map, thereby preventing infection of the access point map.

In further embodiments of the invention, vehicular access point management server 201 monitors telematics unit 157 to keep track of the functioning of vehicle access point 155, regarding factors including, but not limited to: time that vehicle 151 remains parked, and potential parking time; battery drain of vehicle 151 (to prevent battery depletion); additional vehicular access points in the vicinity; current network loads; and other network resource management factors.

In an embodiment of the present invention the server devices illustrated in FIG. 1 and FIG. 2 are physically separate devices. In another embodiment, the server devices illustrated in FIG. 1 and FIG. 2 are logically separate devices combined into a single physical device.

In some embodiments, the databases disclosed herein are maintained in a one of the servers; in other embodiments, the databases are distributed over the Internet.

Figure 3A:
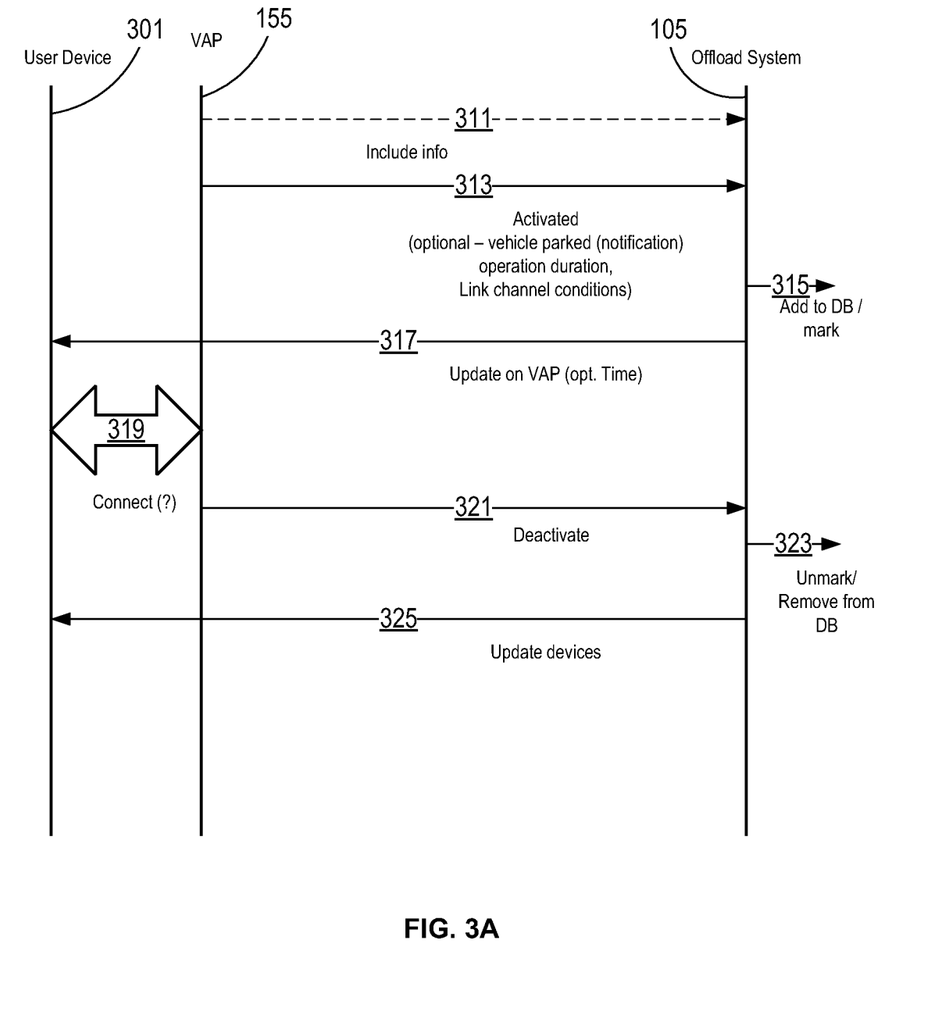
FIG. 3A is a message sequence diagram showing activation and deactivation of a vehicular access point and setup of a connection to a user device according to an embodiment of the present invention.

FIG. 3A is a message sequence diagram showing activation and deactivation of vehicular access point 155 and setup of a connection to a user device 301 according to an embodiment of the present invention. In a related embodiment, a message 311 is optionally sent to offload server 105, confirming the parked status of the vehicle (such as vehicle 151). In a message 313, vehicular access point 155 signals that it has been activated to offload system 105. (In a related embodiment, vehicular access point 155 is activated only upon a decision of vehicular access point management server 201.) In a message 315, vehicular access point 155 is added to database 181—if vehicular access point 155 is already listed in database 181, then it is marked in database 181 as having been activated. Next, a message 317 is sent from offload server 105 to user device 301, allowing a connection 319 to be set up, so that user device 301 is offloaded onto vehicular access point 155. When all connections (such as connection 319) are closed, vehicular access point 155 sends a message 321 to offload server 105 that it is deactivated. In a message 323, vehicular access point 155 is removed from database 181, or it is marked in database 181 as having been deactivated. In a message 325, offload server 105 updates user device 301. In a related embodiment of the invention, relevant user devices are updated according to various metrics, such as with updated subscriber/affiliate information, location, and so forth.

Figure 3B:
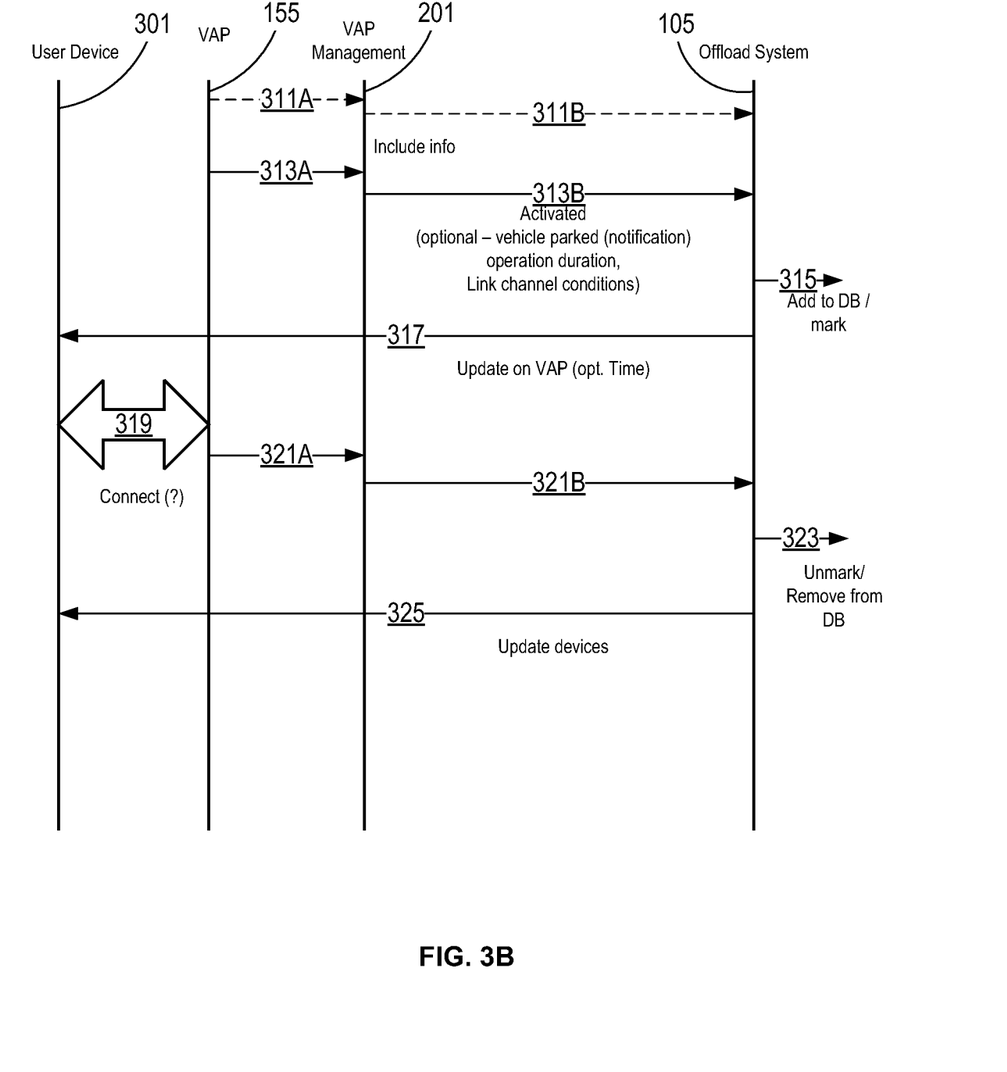
FIG. 3B is a message sequence diagram showing activation and deactivation of a vehicular access point and setup of a connection to a user device according to another embodiment of the present invention.

FIG. 3B is a message sequence diagram showing activation and deactivation of vehicular access point 155 and setup of a connection to a user device according to another embodiment of the present invention. In this embodiment, vehicular access point 155 sends notifications to offload server 105 indirectly, through vehicular access point management server 201. Thus, message 311 (FIG. 3A) is broken into a message 311A from vehicular access point 155 to vehicular access point management server 201, and a subsequent message 311B from vehicular access point management server 201 to offload server 105. In a similar way, message 313 (FIG. 3A) is broken into a message 313A and a message 313B; and message 321 (FIG. 3A) is broken into a message 321A and a message 321B.

Figure 4:
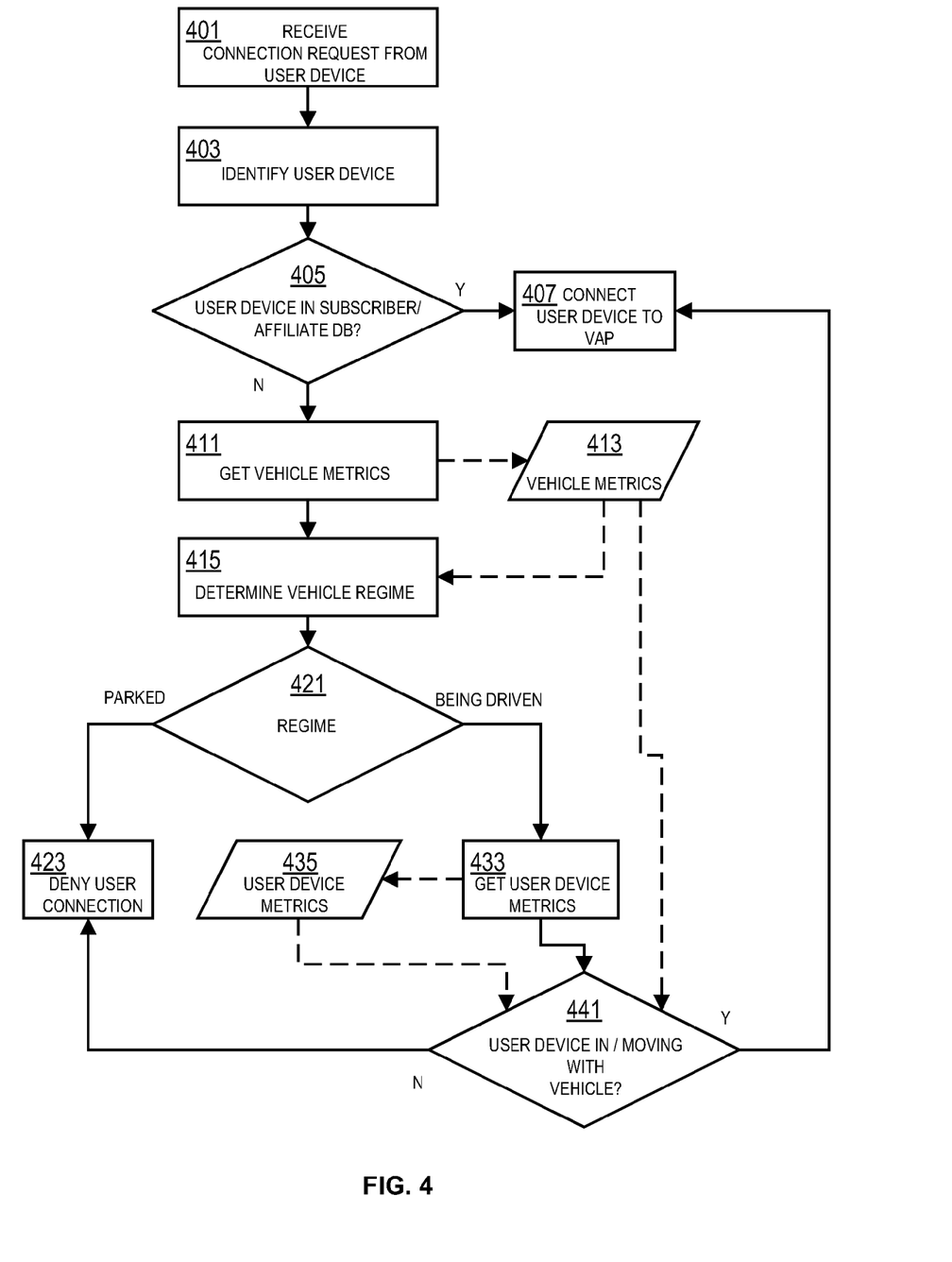
FIG. 4 is a flowchart showing a method for managing connections between a vehicular access point and a user device according to various embodiments of the present invention.

FIG. 4 is a flowchart showing a method for managing a connection between a vehicular access point located on a vehicle and a mobile user data device, according to various embodiments of the present invention. In a step 401 the vehicular access point receives a connection request from a mobile user device. In a step 403 the user device is identified, and at a decision point 405 the subscriber/affiliate database (such as database 191, FIG. 1) is checked to see if the user device is registered. These embodiments provide that a registered user device is authorized for a connection. Thus, if the user device is registered in the subscriber/affiliate database, then in a step 407, the vehicular access point is authorized to allow the user device to connect.

If the user device is not registered in the subscriber/affiliate database, it is still possible that the user device can be authorized to connect to the vehicular access point, if the user is a guest in the driven vehicle. This event can occur, for example, if the guest is a friend of the subscriber, but has not been registered as an affiliate. In this case, flow proceeds to a step 411, in which vehicle metrics 413 are obtained, after which the regime of the vehicle is determined in a step 415. As described previously, various vehicle metrics can be used separately or in combination to determine if the vehicle is being driven or is parked. At a decision point 421, if the vehicle is parked, then the user device (which is unregistered) is considered unauthorized, and in a step 423 the connection request is denied. Otherwise, if the vehicle is being driven, decision point 421 continues with a step 433, in which user device metrics 435 are obtained. User device metrics 435 include position and velocity measurements, which, when compared with respective vehicle metrics 413 at a decision point 441 serve to determine if the user device is moving with the vehicle. If the user device is moving with the vehicle, then the device is considered to be a guest device, and is authorized, whereupon decision point 441 continues to step 407 to establish the connection. Otherwise, decision point 441 continues to step 423 to deny the connection request. It is noted that the method steps described above are performed in different order according to different embodiments of the invention.

According to various embodiments of the present invention, steps of the method are performed by a processing device connected to the vehicular access point. In a related embodiment, the processing device is part of the vehicular access point; in another related embodiment, the processor is an offload server, such as server 105; in a further embodiment, the processing device is a vehicular access point management server, such as server 201.

Various aspects of specific embodiments discussed herein may be combined with aspects from other embodiments. The present invention is not limited by what has been particularly shown and described herein, but rather the scope of the invention is defined by the appended claims.

What is claimed is:

1. A method for managing a connection between a vehicular access point located on a vehicle and a mobile user data device, the method comprising:
   receiving, by the vehicular access point, a request from the mobile user data device to establish a connection with the mobile user data device;
   identifying, by a processing device, the mobile user data device;

determining, by the processing device, whether the mobile user data device is registered in a predetermined subscriber database;
  if the mobile user data device is registered in the subscriber database, then allowing the mobile user data device to establish the connection;
  if the mobile user data device is not registered in the subscriber database, then obtaining vehicle metrics of the vehicle;
  responsively to obtaining the vehicle metrics of the vehicle, determining whether the vehicle is being driven or is parked;
    if the vehicle is parked, then allowing the mobile user data device to establish the connection provided that the mobile user data device is registered in the predetermined subscriber database;
    if the vehicle is being driven, then obtaining metrics of the vehicle;
      determining whether the mobile user data device is moving with the vehicle;
        if the mobile user data device is moving with the vehicle, then allowing the mobile user data device to establish the connection; and
        if the mobile user data device is not moving with the vehicle, then denying the connection request; and
  preventing the mobile user data device from updating a remote server with data on the vehicular access point.

2. The method of claim 1, wherein the processing device is an offload server.

3. The method of claim 1, wherein the processing device is a vehicular access point management server.

4. The method of claim 3, wherein the vehicular access point communicates with an offload server via the vehicular access point management server.

5. A system for managing a connection between a vehicular access point located on a vehicle and a mobile user data device making a request for a connection thereto, the system comprising at least one server connected to the Internet, wherein the at least one server has access to a subscriber database and a vehicular access point database, and wherein the at least one server is operative to:
  identify the mobile user data device;
  responsively to identifying the mobile user data device, determine whether the mobile user data device is registered in the subscriber database;
  obtain mobile user data device metrics from the mobile user data device;
  responsively to obtaining mobile user data device metrics from the mobile user data device, compare mobile user data device metrics from the mobile user data device with the vehicle metrics to determine if the vehicle is being driven and the mobile user data device is moving with the vehicle;
    if the vehicle is parked and the mobile user data device is registered in the subscriber database, then authorize the vehicular access point to establish a connection with the vehicular access point;
    if the vehicle is being driven and the mobile user data device is moving with the vehicle, then authorize the vehicular access point to establish a connection with the mobile user data device; and
    otherwise deny the request for a connection; and
  prevent the mobile user data device from updating a remote server with data on the vehicular access point.

* * * * *